United States Patent
Beck et al.

(10) Patent No.: US 9,080,289 B2
(45) Date of Patent: Jul. 14, 2015

(54) COVER LAYER WITH REDUCED TENSILE PROPERTIES FOR USE OF WEAR-RESISTANT LAMINATE

(71) Applicant: DAKOR MELAMIN IMPRÄGNIERUNGEN GMBH, Heroldstatt (DE)

(72) Inventors: Elmar Beck, Heroldstatt (DE); Detlef Andreas Wentzel, Merklingen (DE)

(73) Assignee: DAKOR MELAMIN IMPRÄGNIERUNGEN GMBH, Heroldstatt (DE)

( * ) Notice: Subject to any disclaimer, the term of this patent is extended or adjusted under 35 U.S.C. 154(b) by 0 days.

(21) Appl. No.: 14/346,369

(22) PCT Filed: Sep. 24, 2012

(86) PCT No.: PCT/EP2012/003978
§ 371 (c)(1),
(2) Date: Mar. 21, 2014

(87) PCT Pub. No.: WO2013/045067
PCT Pub. Date: Apr. 4, 2013

(65) Prior Publication Data
US 2014/0272340 A1    Sep. 18, 2014

(30) Foreign Application Priority Data
Sep. 26, 2011   (DE) .................... 10 2011 114 404

(51) Int. Cl.
| | |
|---|---|
| B32B 3/00 | (2006.01) |
| D21H 17/57 | (2006.01) |
| D21H 27/24 | (2006.01) |
| D21H 27/26 | (2006.01) |
| D21H 27/28 | (2006.01) |
| D21H 17/36 | (2006.01) |
| D21H 17/51 | (2006.01) |
| D21H 17/67 | (2006.01) |
| B32B 21/02 | (2006.01) |
| B32B 21/06 | (2006.01) |
| D21H 17/56 | (2006.01) |

(52) U.S. Cl.
CPC ............... *D21H 17/57* (2013.01); *B32B 21/02* (2013.01); *B32B 21/06* (2013.01); *D21H 17/36* (2013.01); *D21H 17/51* (2013.01); *D21H 17/56* (2013.01); *D21H 17/67* (2013.01); *D21H 27/24* (2013.01); *D21H 27/26* (2013.01); *D21H 27/28* (2013.01); *B32B 2260/028* (2013.01); *B32B 2260/046* (2013.01); *Y10T 428/24909* (2015.01); *Y10T 428/24934* (2015.01); *Y10T 428/27* (2015.01); *Y10T 428/277* (2015.01)

(58) Field of Classification Search
CPC ........ B32B 21/06; B32B 25/06; B32B 29/00; B32B 38/08; C08L 29/04; C08L 61/28
See application file for complete search history.

(56) References Cited

U.S. PATENT DOCUMENTS

| | | | |
|---|---|---|---|
| 2003/0148135 A1* | 8/2003 | Ellstrom | 428/537.1 |
| 2006/0062966 A1* | 3/2006 | Kang et al. | 428/156 |
| 2006/0172118 A1* | 8/2006 | Han et al. | 428/156 |
| 2009/0011193 A1 | 1/2009 | Barwich et al. | |
| 2010/0189931 A1* | 7/2010 | van der Zwan et al. | 428/32.34 |

FOREIGN PATENT DOCUMENTS

| | | |
|---|---|---|
| DE | 1 219 211 B | 6/1966 |
| DE | 1 231 881 B | 1/1967 |
| DE | 10 2004 036 664 A1 | 3/2006 |
| EP | 1 391 478 A1 | 2/2004 |
| GB | 855536 | 12/1960 |

OTHER PUBLICATIONS

International Search Report dated Jan. 30, 2013, for corresponding International Patent Application No. PCT/EP2012/003978.

* cited by examiner

*Primary Examiner* — Elizabeth Mulvaney
(74) *Attorney, Agent, or Firm* — Pergament Gilman & Cepeda LLP; Milagros A. Cepeda; Edward D. Pergament

(57) ABSTRACT

The present invention relates to a low-tension cover layer intended for a laminate material and comprising a resin-impregnated, printed or unprinted decorative paper or comprising a resin-impregnated overlay paper or comprising a combination of the two, where the resin in each case comprises a mixture of at least one aminoplastic resin and at least one water-soluble or water-dispersible synthetic polymer selected from the group consisting of polyvinyl resin, polyvinyl acetate, and polyvinyl alcohol. The invention further relates to the use of the low-tension cover layer of the invention for the construction of a laminate material with appropriate balancing.

12 Claims, No Drawings

COVER LAYER WITH REDUCED TENSILE PROPERTIES FOR USE OF WEAR-RESISTANT LAMINATE

This application is a National Stage Application under 35 U.S.C. §371 of PCT International Application No. PCT/EP2012/003978 filed Sep. 24, 2012, which claims the benefit of German Application No. 10 2011 114 404.1, filed Sep. 26, 2011, all of which are hereby incorporated by reference in their entireties.

The present invention relates to a low-tension cover layer intended for a laminate material and comprising a resin-impregnated, printed or unprinted decorative paper or comprising a resin-impregnated overlay paper or comprising a combination of the two, where the resin in each case comprises a mixture of at least one aminoplastic resin and at least one water-soluble or water-dispersible synthetic polymer selected from the group consisting of polyvinyl resin, polyvinyl acetate, and polyvinyl alcohol. The invention further relates to the use of the low-tension cover layer of the invention for the construction of a laminate material with appropriate balancing.

It is known that sheets for the production of laminate floors can be produced by coating of both sides of sheets of wood-based material. There are thus numerous floorcoverings composed of a large number of layers or sheets which are bonded to one another by adhesive bonding or are joined mechanically to one another. In many cases the sheets comprise a core made of wood or of a wood-based material, an example being highly compacted fiberboard of the type represented by HDF (high density fiberboard) or MDF (medium density fiberboard). The upper side of said core is covered with a surface coating composed of a decorative film, i.e. of a decorative layer, an example being an impregnated decorative paper, and a sheet of floor laminate can therefore comprise a decorative layer which is made of a printed paper and which has been applied on the core via impregnation with a polymerizable aminoplastic resin, such as melamine resin. It is known that an aminoplastic-resin-impregnated overlay is generally applied as further constituent of the surface coating over the decorative layer in the same way.

A known sheet of laminate floor can comprise, on the underside, a layer which in particular is intended to compensate mechanical stresses in the laminate. Said layer can be a compensating foil, but is mostly composed of a simple layer which is made of kraft paper or of recycled paper and which has been impregnated and applied, and which is therefore termed impregnated balancing material.

The present invention is based on the object of providing a low-tension cover layer, i.e. an cover layer with a reduced level of tension properties, which is intended for a laminate material and which allows savings to be achieved in paper and resin in the impregnated balancing material during the production of a laminate material, and therefore also allows attendant savings to be achieved in the costs of production of the laminate material, but without any resultant alteration of the properties of the laminate material product.

Said object is achieved via the embodiments characterized in the claims for the present invention.

In particular, the invention provides a low-tension cover layer intended for a laminate material and comprising a resin-impregnated, printed or unprinted decorative paper or comprising a resin-impregnated overlay paper or comprising a combination of the two, where the resin in each case comprises a mixture of at least one aminoplastic resin and at least one water-soluble or water-dispersible synthetic polymer selected from the group consisting of polyvinyl resin, polyvinyl acetate, and polyvinyl alcohol. In one preferred embodiment of the present invention, the at least one water-soluble or water-dispersible synthetic polymer is polyvinyl alcohol.

The term aminoplastic resin is not subject to any restriction in the invention. It is thus possible by way of example to use melamine resins or urea resins, or else a mixture thereof. In one preferred embodiment of the present invention, the aminoplastic resin is a mixture of melamine resin and urea resin.

The proportion of the at least one water-soluble or water-dispersible synthetic polymer in the resin is not subject to any restriction in the invention. In one preferred embodiment, the at least one water-soluble or water-dispersible synthetic polymer constitutes at least 1% by weight of the resin, more preferably at least 5% by weight of the resin. In one preferred embodiment moreover the at least one water-soluble or water-dispersible synthetic polymer constitutes at most 30% by weight of the resin, more preferably at most 20% by weight of the resin, even more preferably at most 15% by weight of the resin, and most preferably at most 10% by weight of the resin.

The use of the water-soluble or water-dispersible synthetic polymer in the invention permits spatial replacement of the aminoplastic resin in the impregnated decorative paper or overlay paper and thus reduces the number of individual condensation points. It is thus possible, during the production of a laminate material which comprises the low-tension cover layer of the invention, to achieve a marked reduction of the weight of an impregnated balancing material arranged on the reverse side of the carrier of the laminate material.

The printed or unprinted decorative paper and, respectively, decorative film, and the overlay paper, are not subject to any restriction in the invention, as long as they can be impregnated in a manner that is customary in this industrial sector. The printed or unprinted decorative paper is preferably composed of cellulose, optionally with a proportion of recycled material. In particular, the term printed or unprinted decorative paper is to be interpreted broadly in respect of the possible grammage thereof. In one preferred embodiment of the present invention, the weight per unit area of the printed or unprinted decorative paper is from 30 to 90 g/m². The manner of printing of the printed decorative paper is not subject to any kind of restriction in the invention. Accordingly, the printing can by way of example be achieved by copper-based intaglio printing or by digital printing. A printed decorative paper usually comprises from 1 to 10 g/m² of ink, which is preferably applied in from one to four stages.

The impregnation of the printed or unprinted decorative paper can be achieved by using any of the machinery systems customarily used in this industrial sector for the application of binders. The quantity of the resin can be regulated by way of example by means of metering rolls. In one preferred embodiment, the manner of regulation of the quantity of the resin is such that the percentage resinification, based on the mass of the printed or unprinted decorative paper prior to impregnation, is from 30 to 150%. Accordingly, by way of example, if a printed or unprinted decorative paper with a weight per unit area of 70 g/m² is used the final weight of the decorative paper after impregnation is from 90 to 175 g/m². When polyvinyl alcohol is used, a lubrication effect occurs during the impregnation process and allows the gap between the metering rolls to be reduced markedly, and this permits advantageous reduction of the quantity of the resin applied.

In another embodiment of the present invention, the low-tension cover layer can also be composed of an impregnated overlay paper, or alternatively also of a printed or unprinted decorative paper, as described above, with an impregnated overlay paper applied thereto. The overlay paper is usually composed of superior chemical pulp (α-cellulose), the weight_ per unit area of the overlay paper here preferably being from 10 to 70 g/m². The final weight of the impregnated overlay is preferably from 40 to 300 g/m² after impregnation. The final weight of the low-tension cover layer comprising not only a decorative film but also an overlay is from 70 to 350 g/m², preferably from 100 to 300 g/m².

The thickness of the low-tension cover layer is not subject to any restriction in the invention. In one preferred embodiment, the thickness of the low-tension cover layer is from 30 to 250 µm.

In another preferred embodiment of the present invention, when the low-tension cover layer is composed of a printed or unprinted decorative paper, of an impregnated overlay paper, or of a combination of the two, as described above it further comprises hard mineral particles, for example corundum, silicon oxide, and/or silicon carbide. Use of said fillers can inter alia protect the cover layer from wear and damage.

The cover layer of the invention and, respectively, the coating composition therefor can also comprise further additives, for example hardeners, release agents, or wetting agents.

Impregnation systems that are customarily used in this industrial sector, of the type usually used for the production of impregnated decorative papers and of impregnated overlay papers, are suitable for the production of the low-tension cover layer of the invention. The low-tension cover layer of the invention is dried here to the customary residual moisture level of from 4% to 8%.

The present invention moreover provides the use of the low-tension cover layer of the invention for the construction of a laminate material which has a carrier as base, where the cover layer of the invention is arranged on the upper side of the carrier and an impregnated balancing material is arranged on the underside of the carrier. An underlay can optionally be provided between the cover layer and the carrier. Underlays of this type are known in the prior art. These underlays are usually based on phenolic-resin-impregnated or melamine-resin-impregnated papers or glassfiber webs.

In one preferred embodiment, the carrier is a sheet of MDF or of HDF. The impregnated balancing material preferably comprises an impregnated paper, known as the balancing paper, onto which a layer of sound-deadening material can be applied by means of an adhesive coating. The balancing paper is preferably composed of a recycled paper based on superior chemical pulps, an advantageous grammage of the paper prior to impregnation here being from 30 to 140 g/m². The final weight after saturation with, for example, melamine resin is preferably from 100 to 280 g/m². In the present invention it is possible to use a balancing paper with a weight per unit area of 50 g/m² and with a final weight, in the form of impregnated material, of 150 g/m² to replace a balancing paper customarily used with a weight per unit area of 105 g/m² and with a final weight, in the form of impregnated material, of 250 g/m². It is therefore advantageously possible to achieve a saving of about 40% in the mass of the balancing material. The resin comprises an aminoplastic resin composed of urea and/or of melamine resins. The arrangement has the balancing material on the underside of the carrier, in order that the laminate material retains its planarity after hardening in the press and for subsequent use.

Use of the specifically selected resin mixture can advantageously provide a low-tension cover layer for a laminate material. It is thus possible to design the balancing material with less weight (thickness), and to reduce the quantity of resin in the impregnated balancing material, since the cover layer of the invention exerts less tension on the upper side during the hardening process. This leads not only to a saving of manufacturing costs but also to an environmentally responsible reduction of the amount of formaldehyde used in the impregnated balancing material. The low-tension cover layer of the invention has all of the quality features required, for example abrasion resistance, adhesion to the sheet, surface impermeability, and high transparency.

What is claimed is:

1. A low-tension cover layer for a laminate material, comprising a resin-impregnated, printed or unprinted decorative paper or comprising a resin-impregnated overlay paper or comprising a combination of the two, where the resin in each case comprises a mixture of at least one aminoplastic resin and at least one water-soluble or water-dispersible synthetic polymer, where the at least one water-soluble or water-dispersible synthetic polymer is polyvinyl alcohol and constitutes 5% by weight to 10% by weight of the resin and wherein the thickness of the cover layer is from 30 to 250 µm.

2. The low-tension cover layer as claimed in claim 1, where the aminoplastic resin is a mixture of melamine resin and urea resin.

3. The low-tension cover layer as claimed in claim 1, where the weight per unit area of the printed or unprinted decorative paper is from 30 to 90 g/m².

4. The low-tension cover layer as claimed in claim 1, where the printed decorative paper comprises from 1 to 10 g/m² of ink.

5. The low-tension cover layer as claimed in claim 1, where the percentage resinification, based on the mass of the printed or unprinted decorative paper prior to impregnation, is from 30 to 150%.

6. The low-tension cover layer as claimed in claim 1, which further comprises hard mineral particles.

7. The low-tension cover layer as claimed in claim 1, where the weight per unit area of the overlay paper is from 10 to 70 g/m².

8. The use of the low-tension cover layer as claimed in claim 1 for the construction of a laminate material which has a carrier as base, where the low-tension cover layer is arranged on the upper side of the carrier and an impregnated balancing material is arranged on the underside of the carrier.

9. The use as claimed in claim 8, where the carrier is a sheet of MDF or of HDF.

10. The use as claimed in claim 8, where the impregnated balancing material is a balancing paper onto which a layer of sound-deadening material has been applied by means of an adhesive coating.

11. The use as claimed in claim 10, where the balancing paper is composed of a recycled paper based on superior chemical pulps and has a grammage, prior to impregnation, of from 30 to 140 g/m².

12. The use as claimed in claim 11, where the final weight of the balancing paper after saturation with a resin is from 100 to 250 g/m².

* * * * *